United States Patent
Yang et al.

(10) Patent No.: US 7,213,921 B2
(45) Date of Patent: May 8, 2007

(54) COLOR DISPLAY DEVICE USING DICHROIC FILTER

(75) Inventors: Haeng Seok Yang, Gyeonggi-do (KR); Dong Ho Shin, Seoul (KR); Kwan Young Oh, Gyeonggi-do (KR); Jun Won An, Gyeonggi-do (KR); Sang Kyeong Yun, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 185 days.

(21) Appl. No.: 11/157,484

(22) Filed: Jun. 21, 2005

(65) Prior Publication Data

US 2006/0082735 A1 Apr. 20, 2006

(30) Foreign Application Priority Data

Oct. 15, 2004 (KR) .................. 10-2004-0082754

(51) Int. Cl.
*G03B 21/26* (2006.01)
*G03B 21/14* (2006.01)
*G02B 27/10* (2006.01)
*G02B 27/42* (2006.01)
*G02B 5/18* (2006.01)

(52) U.S. Cl. .................. 353/30; 353/84; 359/618; 359/558

(58) Field of Classification Search .................. 353/84, 353/30, 31, 39, 81, 102; 359/201, 202, 204, 359/618, 627, 638, 558, 559
See application file for complete search history.

(56) References Cited

U.S. PATENT DOCUMENTS 5,374,947 A 12/1994 Takahashi et al.

*Primary Examiner*—William Dowling
*Assistant Examiner*—Andrew Kong
(74) *Attorney, Agent, or Firm*—Christensen O'Connor Johnson Kindness PLLC

(57) ABSTRACT

A color display device is disclosed. The color display device includes an illumination lens system, a diffractive light modulation system, a combining system, a Fourier filter system, and a projection system. The illumination lens system converts a plurality of light beams into linear parallel light beams. The diffractive light modulation system produces a plurality of diffracted light beams having a plurality of diffraction orders by modulating each of the plurality of parallel light beams that are almost perpendicularly incident from the illumination lens system, The combining system focuses the plurality of diffracted light beams having the plurality of diffraction orders. The Fourier filter system selects diffracted light beams having desired diffraction orders using a dichroic filter. The projection system focuses the diffracted light beams on an object, and allowing the focused diffracted light beams to scan the object.

7 Claims, 10 Drawing Sheets

US 7,213,921 B2

COLOR DISPLAY DEVICE USING DICHROIC FILTER

BACKGROUND OF THE INVENTION

1. Field of the Invention

The present invention relates generally to a color display device and, more particularly, to a color display device, which improves diffraction efficiency by causing light to be almost perpendicularly incident on diffractive light modulators, and which uses a dichroic filter to select diffracted light beams having desired orders from among a plurality of diffracted light beams having a plurality of orders.

2. Description of the Related Art

A light beam scanning apparatus is an apparatus for producing an image by causing a light beam to form spots on a photosensitive medium through scanning in an image forming apparatus such as a laser printer, a display device, a Light Emitting Diode (LED) printer, an electrophoto copying machine or a word processor.

As image forming apparatuses develop toward compactness, high speed and high resolution, light beam scanning apparatuses have been accordingly researched and developed to have the characteristics of compactness, high speed and high resolution.

Light beam scanning apparatuses for image forming apparatuses may be mainly classified into laser scanning type apparatuses using an f·θ lens, and image head printer type apparatuses, according to the light beam scanning method and the construction of a light beam scanning apparatus.

FIG. 1 is a perspective view showing the configuration of a conventional laser scanning apparatus using an f·θ lens.

Referring to FIG. 1, the conventional laser scanning apparatus includes a Laser Diode (LD) 10 that radiates a light beam in response to a video signal, a collimator lens 11 that converts the light beam, which is radiated from the LD 10, into parallel light, a cylinder lens 12 that converts the parallel light, which is passed through the collimator lens 11, into linear light coplanar with a scanning direction, a polygon mirror 13 that reflects the linear light, which is passed through the cylinder lens 12, while moving it at a constant linear velocity, a polygon mirror driving motor 14 that rotates the polygon mirror 13 at a constant velocity, an f·θ lens 15 that has a constant refractive index with respect to an optical axis, deflects the light, which is reflected by the polygon mirror 13 and which has a constant angular velocity, in a principal scanning direction, corrects aberrations of the light and focuses the corrected light on an illumination surface, a reflection mirror 16 that reflects the light beam, which is passed through the f·θ lens 15, in a predetermined direction and forms a dot-shaped image on the surface of a photosensitive drum 17, that is, an image plane, a horizontal sync mirror 18 that reflects the laser beam, which is passed through the f·θ lens 15, in a horizontal direction, and an optical sensor 19 that receives the laser beam, which is reflected by the horizontal sync mirror 18, and performs synchronization.

It is difficult for the above-described laser scanning type light beam scanning apparatus to achieve high-speed printing, due to the low switching speed of the laser diode 10 and the speed problem of the polygon mirror 13.

That is, to increase the scanning speed of the light beam, the polygon mirror 13 must be rotated using a high-speed motor. However, the high-speed motor is expensive, and the motor operating at high speed generates heat, vibration and noise, thus degrading operational reliability, so that a significant improvement in scanning speed cannot be expected.

Another scheme for improving the speed of the light beam scanning apparatus relates to an image head printing type light beam scanning apparatus using a multi-beam type beam formation apparatus.

Such a multi-beam optical scanning apparatus has a plurality of light emitting parts (laser heads) as light sources. The multi-beam optical scanning apparatus optically scans the surface of a recording medium using a plurality of light spots formed on the surface of the recording medium in such a way that a plurality of light beams radiated from the plurality of light emitting parts is focused by an imaging lens through an optical reflector.

In order to accomplish high-speed printing using only a single light spot, the number of times the surface of the recording medium is optically scanned per unit time must be significantly large. Meanwhile, the rotational speed of the optical reflector and the image clock cannot comply with the large number of optical scans. Accordingly, if the number of beam spots that simultaneously scan the surface of the recording medium increases, the rotational speed of the optical reflector and the image clock may be reduced in proportion to the number of beam spots.

In order to form a plurality of beam spots in the most effective manner, a laser element that functions as a light source has a plurality of light emitting points (light emitting parts) that can be independently operated.

Such a laser element having a plurality of light emitting points is commonly called a "monolithic multi-beam laser element." When the monolithic multi-beam laser element is used, most of optical elements disposed behind the light source can be used for a plurality of light beams, so that the monolithic multi-beam laser element provides significant advantages in terms of cost, process and control.

FIG. 2 is a view illustrating a conventional laser scanning scheme in which laser scanning is performed by a plurality of beams produced by an LED array disposed in an image head.

Referring to FIG. 2, an LED array 21 is disposed in an image head 20 to have LEDs that can cover the width of printing paper, and generates a plurality of beams. Unlike the laser scanning scheme, printing can be performed on a line-at-a-time basis without using a polygon mirror or an f·θ lens, thus significantly improving printing speed.

This monolithic multi-beam laser element includes a so-called surface emitting laser (surface emitting type semiconductor laser).

The surface emitting laser emits light beams parallel to the thickness direction of a silicon layer, whereas a conventional semiconductor laser emits light beams perpendicular to the thickness direction of a silicon layer.

Furthermore, the surface emitting laser has the following characteristics. That is, the conventional semiconductor laser emits divergent light that has an elliptical cross section and considerably varied divergence angles, whereas the surface emitting laser can emit a circular beam that has a stabilized divergence angle.

However, the surface emitting laser has a problem in that an output light beam has an unstable polarization direction. Although the polarization direction can be controlled by the manufacturing method to some degree, it varies depending upon a light emitting point, ambient temperature and output.

The reflectance, transmittance and angle characteristics of the optical elements of an optical scanning apparatus, such as a polygonal mirror like an optical reflector, the scanning lens (f•θ lens) of an optical imaging system, and an echo mirror for changing an optical path, vary depending upon the polarization direction of an input light beam.

For this reason, when the monolithic multi-beam laser element including a surface emitting laser is used as the light source of an optical scanning apparatus, a plurality of beam spots that optically scans the surface of a recording medium have different intensities due to the different polarization directions of light emitting points. Further, the difference in intensity results in irregular pitch in an image, thus considerably degrading image quality.

SUMMARY OF THE INVENTION

Accordingly, the present invention has been made keeping in mind the above problems occurring in the prior art, and an object of the present invention is to provide a color display device, which minimizes optical loss occurring when diffracted light beams are produced by diffractive light modulators, and which uses a dichroic filter to select diffracted light beams having desired orders from among a plurality of diffracted light beams having a plurality of orders.

In order to accomplish the above object, the present invention provides a color display device includes an illumination lens system for converting a plurality of light beams, which are output from a plurality of light sources, into linear parallel light beams; a diffractive light modulation system for producing a plurality of diffracted light beams having a plurality of diffraction orders by modulating each of the plurality of parallel light beams that are almost perpendicularly incident from the illumination lens system; a combining system for focusing the plurality of diffracted light beams having the plurality of diffraction orders, which are incident from the diffractive light modulation system; a Fourier filter system for selecting diffracted light beams having desired diffraction orders from among the plurality of diffracted light beams focused by the combining system, using a dichroic filter; and a projection system for focusing the diffracted light beams, which are selected by the Fourier filter, on an object, and allowing the focused diffracted light beams to scan the object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The construction of a color display device using a dichroic slit according to the present invention is described in detail with reference to the drawings below.

Figure 1:
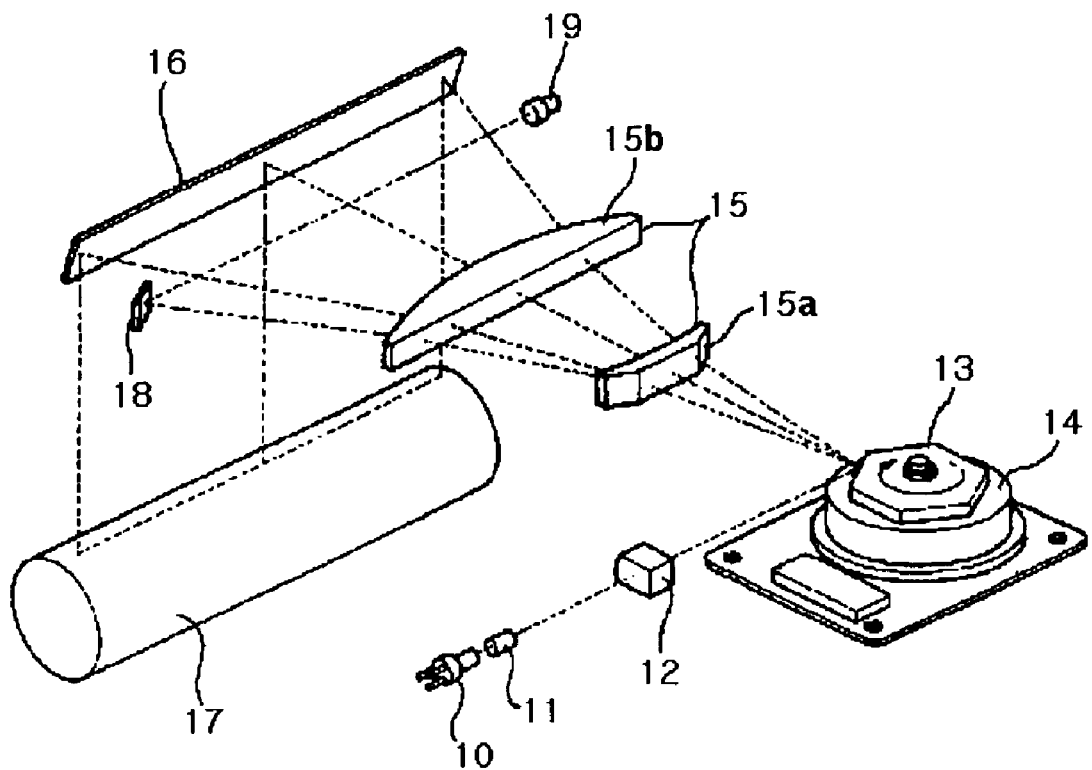
FIG. 1 is a perspective view showing the construction of a conventional laser scanning apparatus using a single light source and an f•θ lens.
Figure 2:
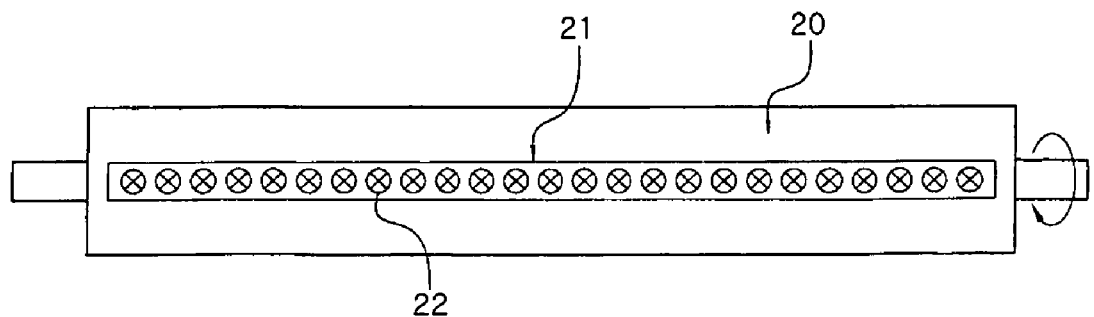
FIG. 2 is a view showing a conventional laser scanning scheme in which laser scanning is performed by a plurality of beams produced by an LED array formed in an image head.
Figure 3:
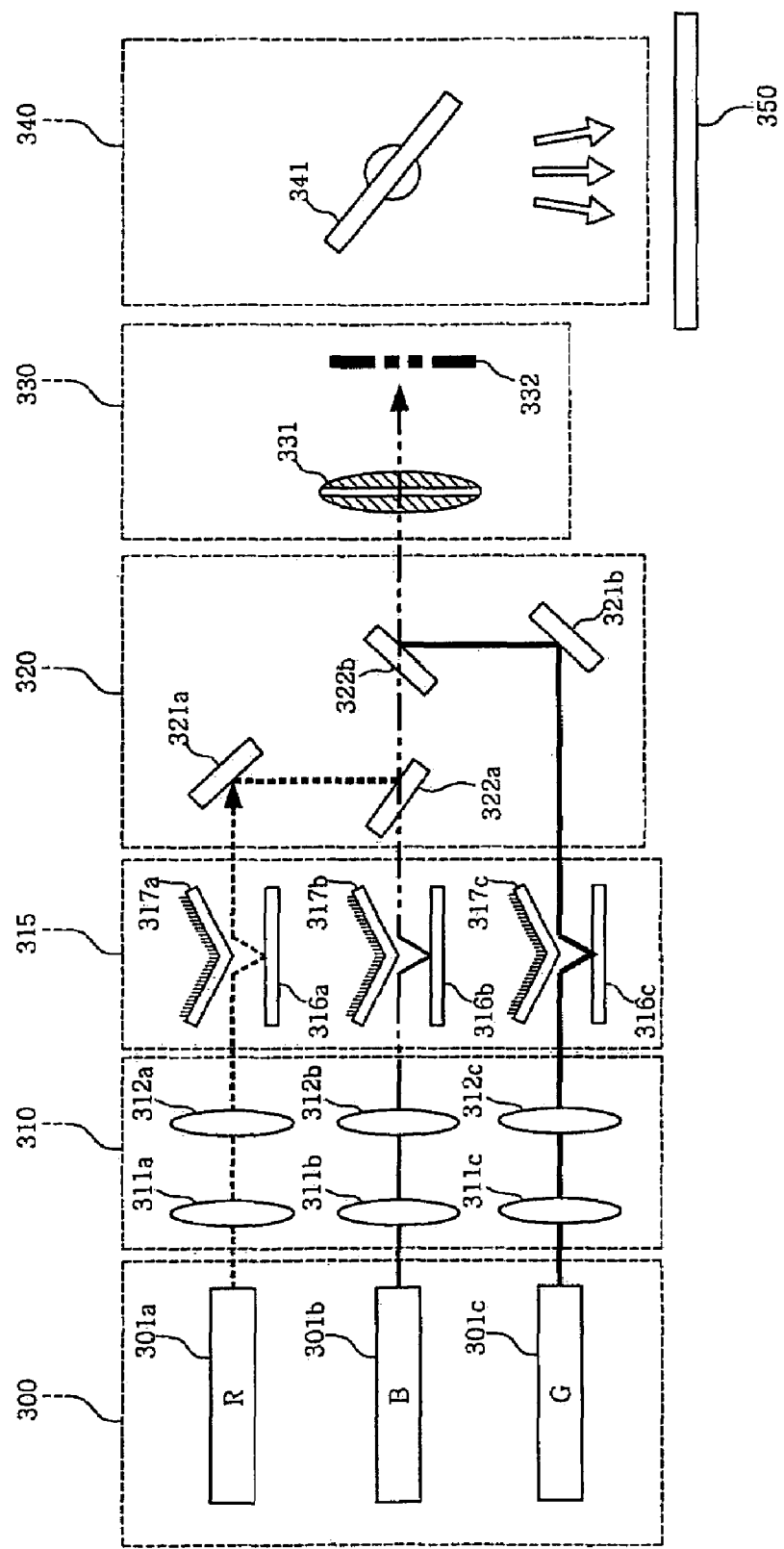
FIG. 3 is a view showing the construction of a color display device using a dichroic slit according to an embodiment of the present invention.

FIG. 3 is a diagram showing the construction of a color display device using a dichroic slit according to an embodiment of the present invention.

Referring to FIG. 3, the color display device using the dichroic slit according to the embodiment of the present invention includes a plurality of light sources 300, an illumination lens system 310, a diffractive light modulation system 315, a combining system 320, a Fourier filter system 330, a projection system 340, and a screen 350.

The plurality of light sources 300 is composed of, for example, a red light source 301a, a blue light source 301b and a green light source 301c. The plurality of light sources 300 may be light sources that are formed of semiconductor devices such as LEDs or Laser Diodes (LDs). Such semiconductor light sources have many characteristics that are suitable for use in color display apparatuses compared to other light sources.

Figure 4A:
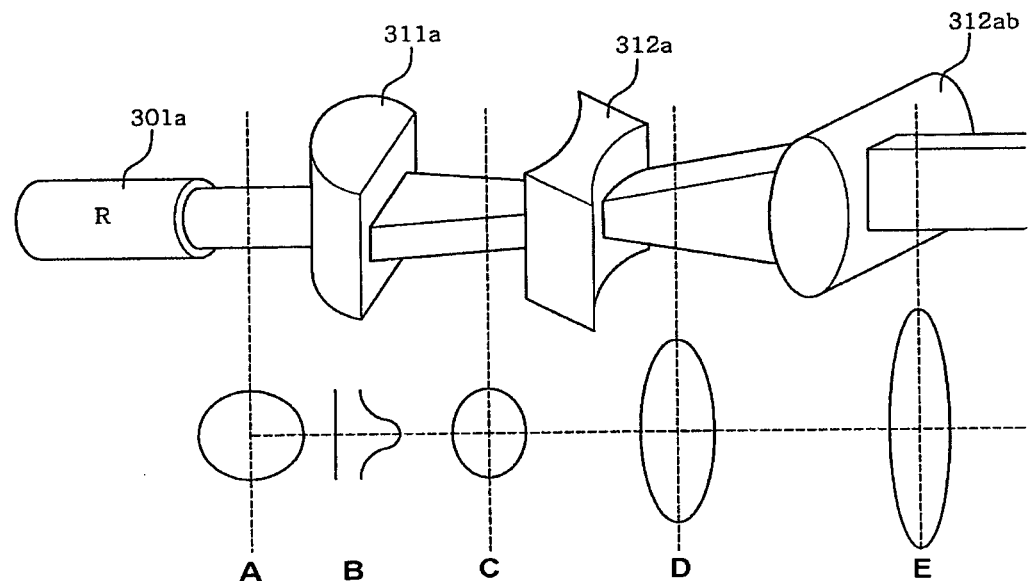
FIGS. 4A to 4C are a perspective view, a plan view, a side sectional view and a cross section showing an optical path produced through the illumination lens system of FIG. 3, respectively.
Figure 4B:
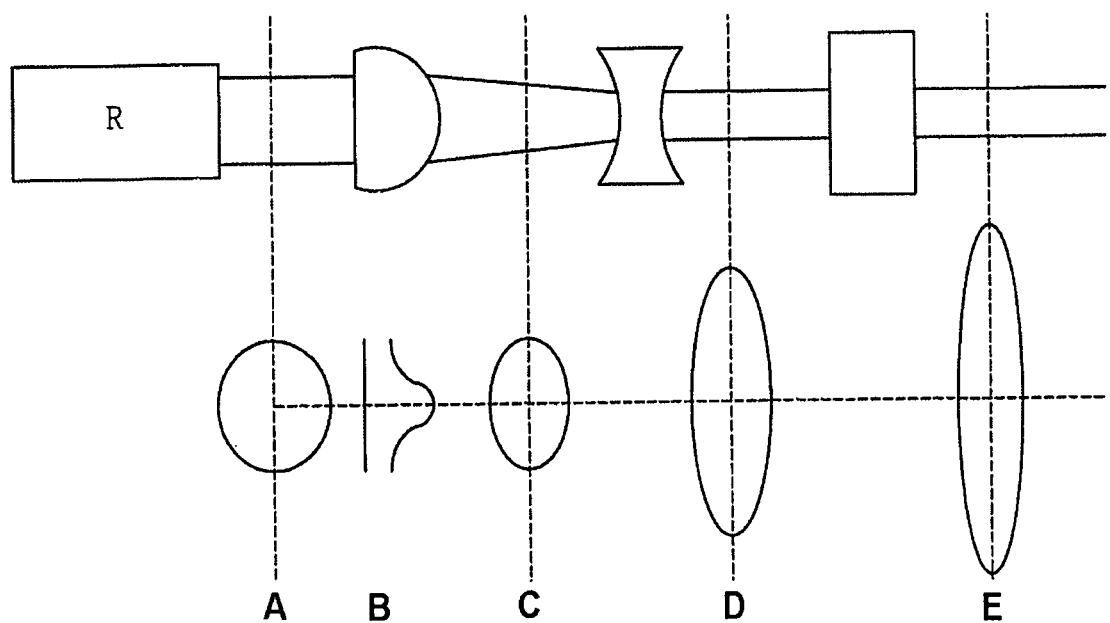
Figure 4C:
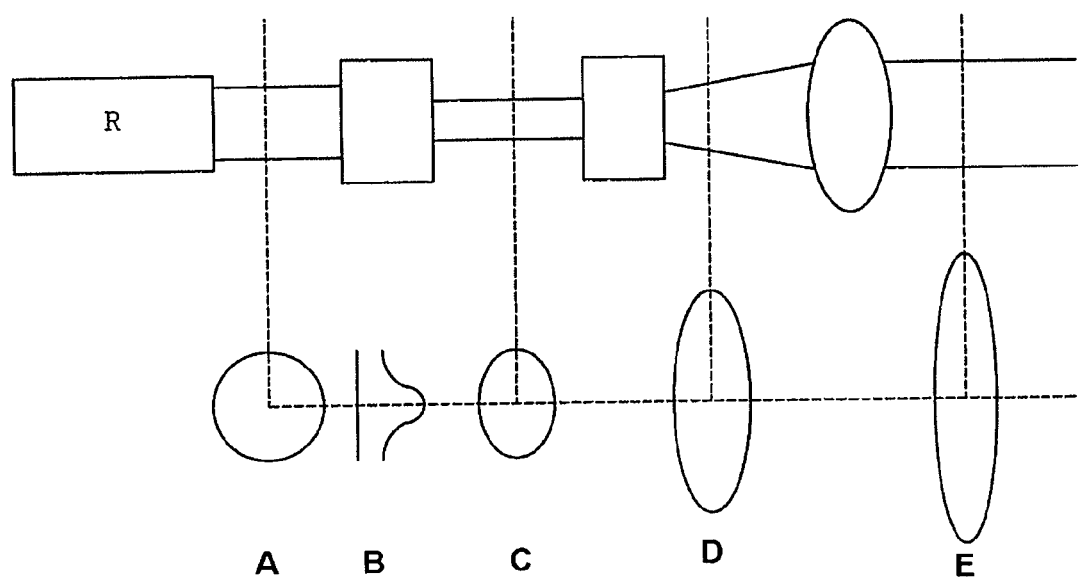

A cross section of the light beam is indicated by "A" of FIG. 4A to 4C. Referring to "A" of FIG. 4A to 4C, the cross section of the light beam is circular, and the intensity profile of the light beam has Gaussian distribution as indicated by "B" of FIG. 4A to 4C.

The illumination lens system 310 converts incident light into linear parallel light having an elliptical cross section. The illumination lens system 310 is composed of a plurality of cylinder lenses 311a to 311c and a plurality of collimator lenses 312a to 312c.

That is, the illumination lens system 310 converts light beams, which are radiated from the plurality of light sources 300 (301a to 301c), into linear light beams coplanar with optical paths, and then focuses them onto diffractive light modulators 316a to 316c, which will be described later.

In this case, the cylinder lenses 311a to 311c convert the parallel beams, which are radiated from the plurality of light sources 310a to 310c, into linear light beams indicated by "C" of FIG. 4A to 4C, and then allow the linear light beams to be incident on the diffractive light modulators 316a to 316c through the collimator lenses 312a to 312c.

In this case, the plurality of collimator lenses 312a to 312c convert spherical light beams, which are radiated from the light source 300 through the cylinder lenses 311a to 311c, into parallel light beams, and then allow them to be incident on the diffractive light modulators 316a to 316c.

The collimator lens 312a (although only the collimator lens 312a is described herein, the remaining collimator lenses have the same construction and operation) includes a concave lens 312aa and a convex lens 312ab, as shown in FIGS. 4A to 4C.

The concave lens 312aa vertically stretches a linear light beam incident from the cylinder lens 311a, as indicated by "D" of FIG. 4A to 4C, and then allows it to be incident on the convex lens 312ab. The convex lens 312ab converts the light beam incident from the concave lens 312aa into a parallel light beam, as indicated by "E" of FIG. 4A to 4C, and then outputs the parallel beam. FIG. 4A is a perspective view illustrating an optical system having a light source, a cylinder lens and a collimator lens, FIG. 4B is a plan view of FIG. 4A, FIG. 4C is a side sectional view of the optical system.

The diffractive light modulation system 315 includes a plurality of diffractive light modulators 316a to 316c, and a plurality of reflection mirrors 317a to 317c. In this case, the reflection mirrors 317a to 317c reflect parallel light incident from the illumination lens system 310, and then causes the parallel light to be almost perpendicularly incident on diffractive light modulators 316a to 316c. When the light incident on the diffractive light modulators 316a to 316c is caused to be almost perpendicularly incident on the diffractive light modulators 316a to 316c, optical efficiency is correspondingly improved.

Further, the diffractive light modulators 316a to 316c are preferably open hole-type diffractive light modulators, and produce diffracted light by reflecting or diffracting incident light. In this case, the reflection mirrors 317a to 317c reflect the diffracted light formed by the diffractive light modulators 316a to 316c so that the diffracted light progresses along the same path as the light output from the illumination lens system 310.

Figure 5:
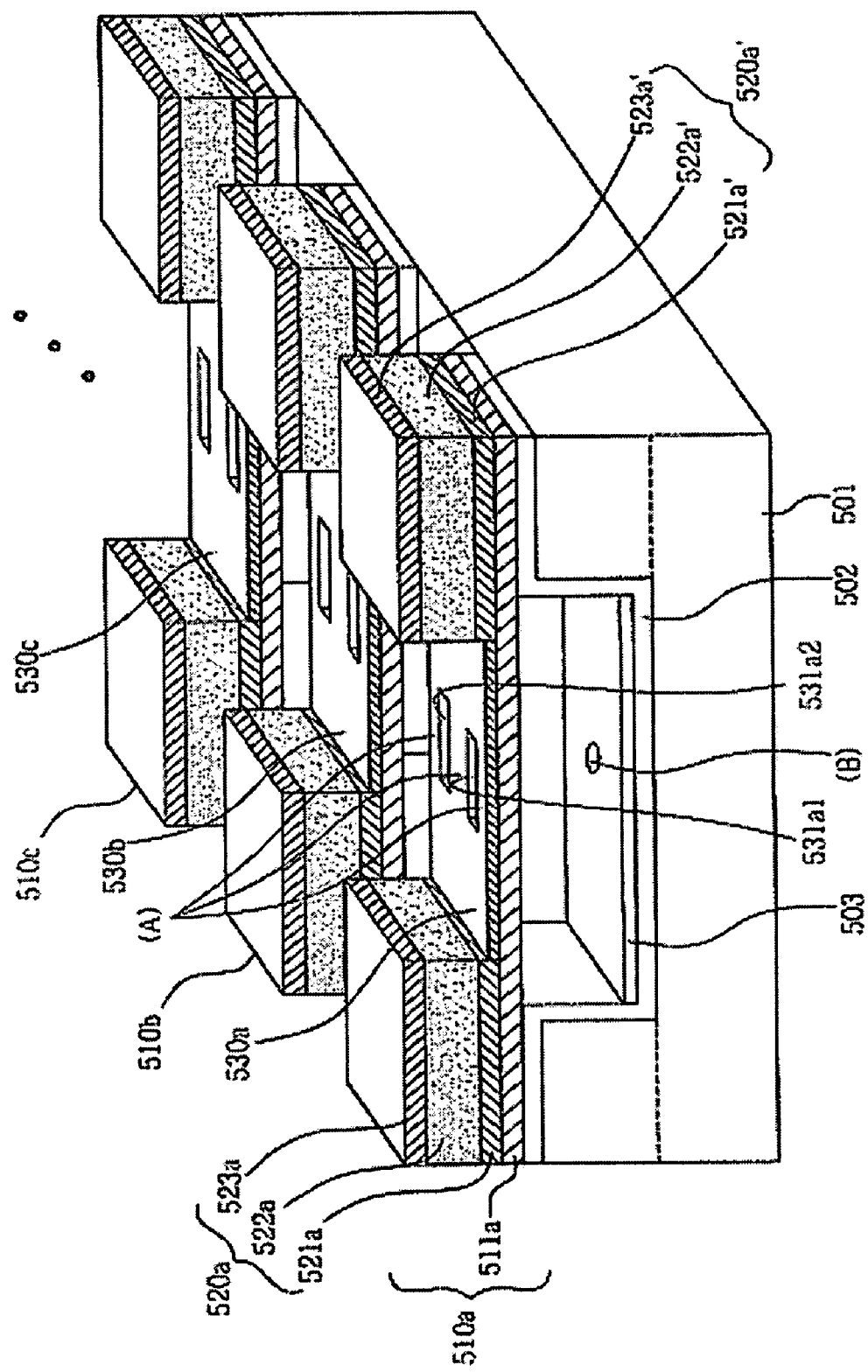
FIG. 5 is a perspective view illustrating the construction of the diffractive light modulator of FIG. 3.

An example of the open hole-type diffractive light modulators 316a to 316c is shown in FIG. 5. Referring to FIG. 5, the open hole-type diffractive light modulator according to the embodiment of the present invention includes a silicon substrate 501, an insulation layer 502, a lower micro mirror 503, and a plurality of elements 510a to 510n. Although, in the present embodiment, the insulation layer and the lower micro mirror are separately constructed, the insulation layer itself can function as the lower micro mirror if it has a light-reflecting characteristic.

The silicon substrate 501 is provided with a depressed portion to provide air spaces to the elements 510a to 510n. The insulation layer 502 is formed on the silicon substrate 501. The lower micro mirror 503 is deposited on the insulation layer 502 above the depressed portion of the silicon substrate 501. The bottoms of the elements 510a to 510n are attached to both sides of the insulation layer 502 beside the depressed portion of the silicon substrate 501. The silicon substrate 501 can be fabricated of a single material such as Si, $Al_2O_3$, $ZrO_2$, quartz or SiO2. The upper and lower layers (divided by dotted lines in FIG. 5) of the silicon substrate 501 can be fabricated of heterogeneous materials.

The lower micro mirror 503 is deposited above the silicon substrate 501, and diffracts incident light by reflecting it. The lower micro mirror 503 can be fabricated of a metallic material such as Al, Pt, Cr or Ag.

The element 510a (although only the element 510a is described herein, the remaining elements have the same construction and operation) has a ribbon shape. The element 510a includes a lower support 511a, both sides of the bottom of which are attached to both sides of the insulation layer 502 beside the depressed portion of the silicon substrate 501, so that the central portion of the lower support 511a is spaced apart from the depressed portion of the silicon substrate 501.

Piezoelectric layers 520a and 520a' are formed on both sides of the lower support 511a. Driving force is provided to the element 510a by the contraction and expansion of the piezoelectric layers 520a and 520a'.

The lower support 511a may be fabricated of Si oxide such as $SiO_2$, Si nitride such as $Si_3N_4$, a ceramic substrate such as Si, $ZrO_2$ and $Al_2O_3$, and Si carbide. However, the lower support 511a may be omitted when necessary.

Each of the piezoelectric layers 520a and 520a' includes a lower electrode layer 521a or 521a' configured to provide a piezoelectric voltage, a piezoelectric material layer 522a or 522a' formed on the lower electrode layer 521a or 521a' and configured to contract and expand and generate vertical driving force when voltages are applied to both surfaces thereof, and a upper electrode layer 523a or 523a' formed on the piezoelectric material layer 522a or 522a' and configured to provide a piezoelectric voltage to the piezoelectric material layer 522a or 522a'. When voltage is applied to the upper electrode layers 523a and 523a' and the lower electrode layers 521a and 521a', the piezoelectric material layers 522a and 522a' contract and expand, thus causing vertical movement of the lower support 511a.

The electrodes 521a, 521a', 523a and 523a' may be fabricated of a material such as Pt, Ta/Pt, Ni, Au, Al or $RuO_2$, and may be deposited by sputtering or evaporation to have a thickness within a range of 0.01 to 3 μm.

Meanwhile, an upper micro mirror 530a is deposited on the center portion of the top of the lower support 511a, and includes a plurality of open holes 531a1 and 531a2. In this case, the open holes 531a1 and 531a2 preferably have a rectangular shape, but may have any closed curve shape such as a circle or an ellipse. When the lower support 511a is fabricated of a light-reflective material, the upper micromirror 530a is not necessary. In this case, the lower support 511a may function as the upper micro mirror.

The open holes 531a1 and 531a2 pass light incident on the element 510a therethrough, and allow the light to be incident on the portion of the lower micro mirror 503 corresponding to the portion where the open holes 531a1 and 531a2 are formed, so that the lower micro mirror 503a and the upper micro mirror 530a can form a pixel.

That is, for example, the portion "A" of the upper micro mirror 530a where the open holes 531a1 and 531a2 are formed, and the portion "B" of the lower micro mirror 503 can form a single pixel.

In this case, the incident light, which passes through the portion where the open holes 531a1 and 531a2 of the upper micro mirror 530a are formed, can be incident on the corresponding portion of the lower micro mirror 503. When the distance between the upper micro mirror 530a and the lower micro mirror 503 is an odd multiple of λ/4, maximally diffracted light is produced. In addition, an open hole-type diffractive light modulator applicable to the present invention is disclosed in U.S. patent application Ser. No. 10/952,573.

Meanwhile, the open hole-type diffractive light modulators 316a to 316c form diffracted light by diffracting linear light incident from the illumination lens system 310, and cause the diffracted light to be incident on the beam splitter 320.

Figure 6:
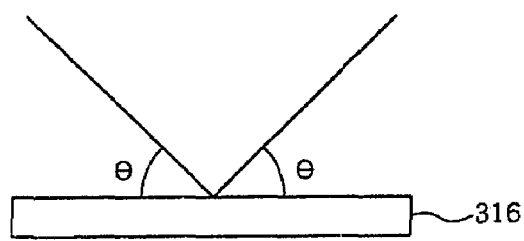
FIG. 6 is a view illustrating the reflection angle of the diffractive light modulator of FIG. 3.

At this time, the reflection angle of the diffracted light is shown in FIG. 6. From FIG. 6, it can be understood that the incidence angle and reflection angle of the light are the same. That is, when the incidence angle is incident on the diffractive light modulators 316a to 316c at an angle of θ°, the reflection angle is also θ°.

Figure 7:
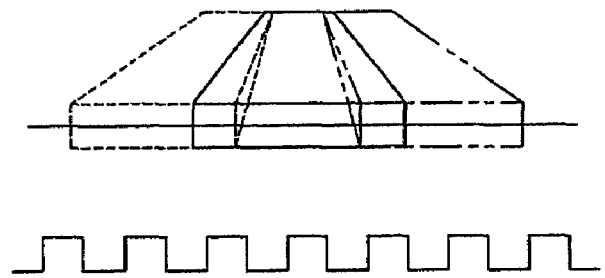
FIG. 7 is a schematic diagram illustrating diffracted light generated by the diffractive light modulator of FIG. 3.

The diffracted light formed by the diffractive light modulators 316a to 316a is shown in FIG. 7. From FIG. 7, it can be understood that 0-order and ±1-order diffracted light are formed in the periodical direction of a lattice.

Meanwhile, the combining system 320 includes a plurality of the reflection mirrors 321a and 321b, and a plurality of prisms 322a and 322b. The plurality of reflection mirrors 321a and 321b reflects diffracted light incident from the diffractive light modulation system 315, and then causes the diffracted light to be incident on prisms 322a and 322b. That is, for example, the reflection mirror 321a causes a diffracted light beam to be incident on the prism 322a, and the reflection mirror 321b causes another diffracted light beam to be incident on the prism 322b.

In this case, the angle of inclination of each of the reflection mirrors 321a and 321b is important. If the angle of inclination is appropriately adjusted, the diffracted light beams reflected by the prisms 322a and 322b can be converged such that they have the same path (strictly speaking, 0-order diffracted light beams have the same path). This process is shown in FIGS. 8A and 8B.

Figure 8A:
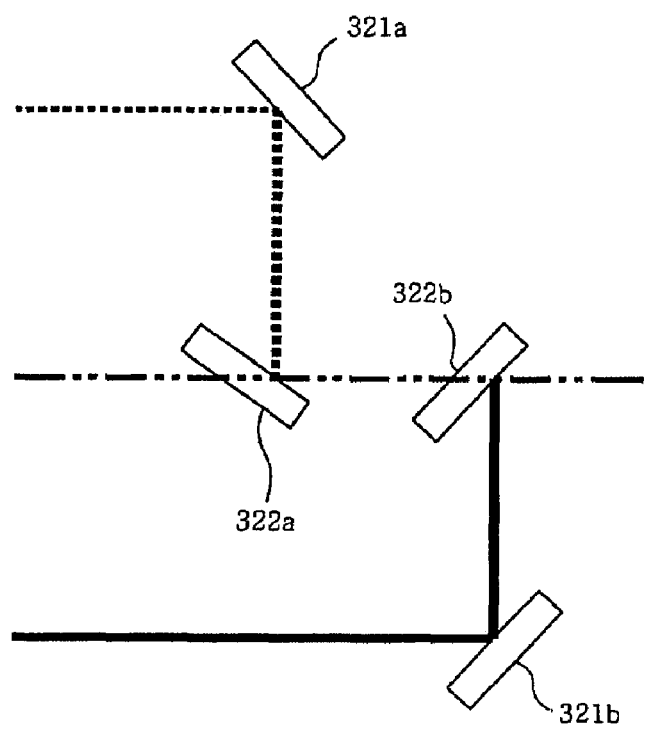
FIG. 8A is a view showing optical paths formed through a combining system according to an embodiment of the present invention.

FIG. 8A is a view showing optical paths formed through a combining system according to an embodiment of the present invention. Since the reflection mirrors 321a and 321b are inclined at an angle of 45°, reflected light is also inclined at an angle of 45°. As a result, the light reflected by the prisms 322a, 322b has a reflection angle of 0° with respect to an X plane.

FIG. 8A shows the path of diffracted light that has passed through the prisms 322a and 322b. From FIG. 8A, it can be understood that, for the diffracted light having a first wavelength, 0-order diffracted light and ±1-order diffracted light overlap each other. Accordingly, the Fourier filter system 330 needs to separate the 0-order diffracted light and the ±1-order diffracted light. For this purpose, after the 0-order diffracted light and the ±1-order diffracted light has been separated, diffracted light beams having desired orders are selected using the dichroic filter 332. Of course, when viewed from the Y plane, the paths of light having all the wavelengths seem to be located along the same axis.

Figure 8B:
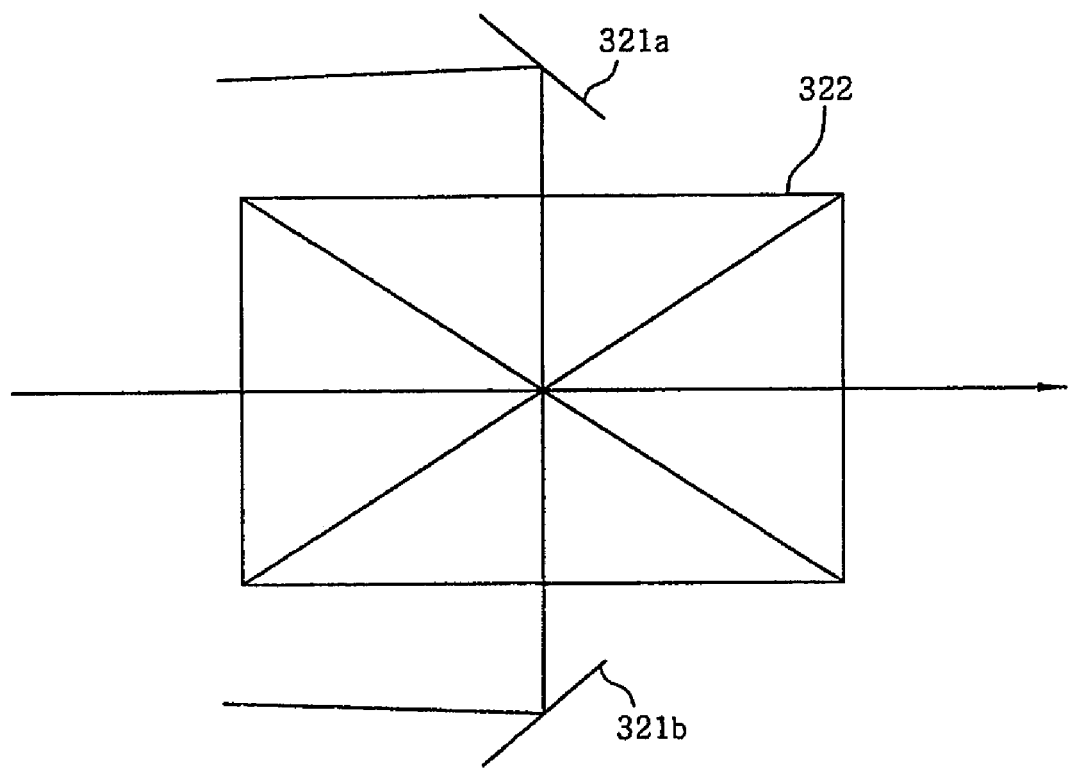
FIG. 8B is a view showing optical paths produced through a combining system according to another embodiment of the present invention.

FIG. 8B is a view showing optical paths produced through a combining system according to another embodiment of the present invention. The combining system includes a plurality of reflection mirrors 321a, 321b, and a beam splitter 322.

As shown in FIG. 8B, if the reflection mirrors 321a, 321b are inclined at an angle of 45°, an exit angle is also 45°.

The diffracted light reflected by the reflection mirrors 321a and 321b is then incident on the beam splitter 322. In this case, the incidence angle is 45°. As a result, the diffracted light reflected by the beam splitter 322 has a reflection angle of 0° with respect to the X-prism plane.

Moreover, FIG. 8B shows the path of diffracted light that has passed through the beam splitter 322.

From FIG. 8B, it can be understood that, for the diffracted light having a first wavelength, the 0-order diffracted light and the ±1-order diffracted light overlap each other. Accordingly, the Fourier filter system 330 needs to separate the 0-order diffracted light and the ±1-order diffracted light from each other. For this purpose, after the 0-order diffracted light and the ±1-order diffracted light are separated, diffracted light having desired orders can be selected using the dichroic filter 332. Of course, when viewed from the Y plane, the paths of light beams having all the wavelengths seem to be located in the same axis.

The Fourier filter system 330 preferably includes a Fourier lens 331 and a dichroic filter 332. The Fourier lens 331 separates incident diffracted light beams on an order basis, and the dichroic filter 332 passes only diffracted light beams having desired orders therethrough.

Figure 9A:
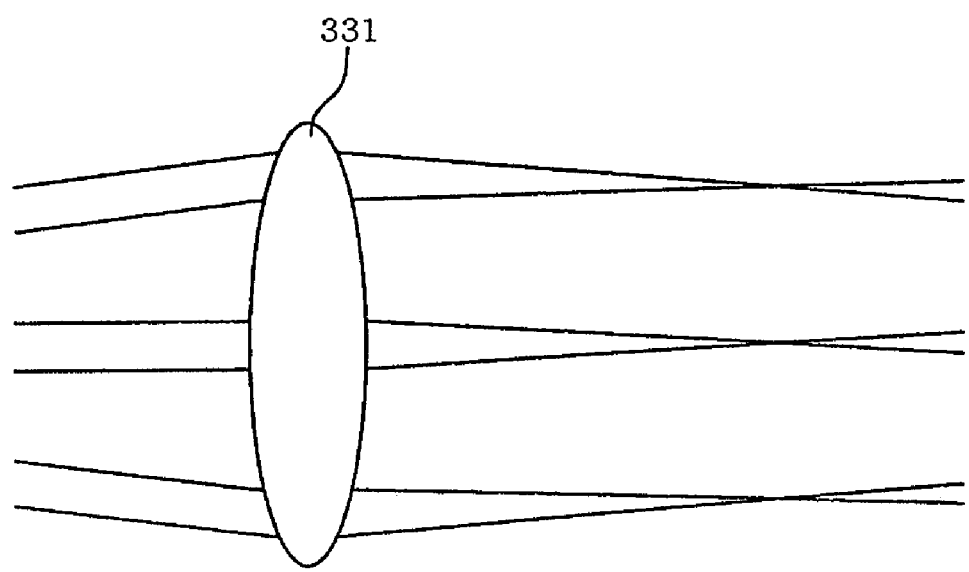
FIGS. 9A and 9B are views illustrating optical paths produced through the Fourier lens of FIG. 3.
Figure 9B:
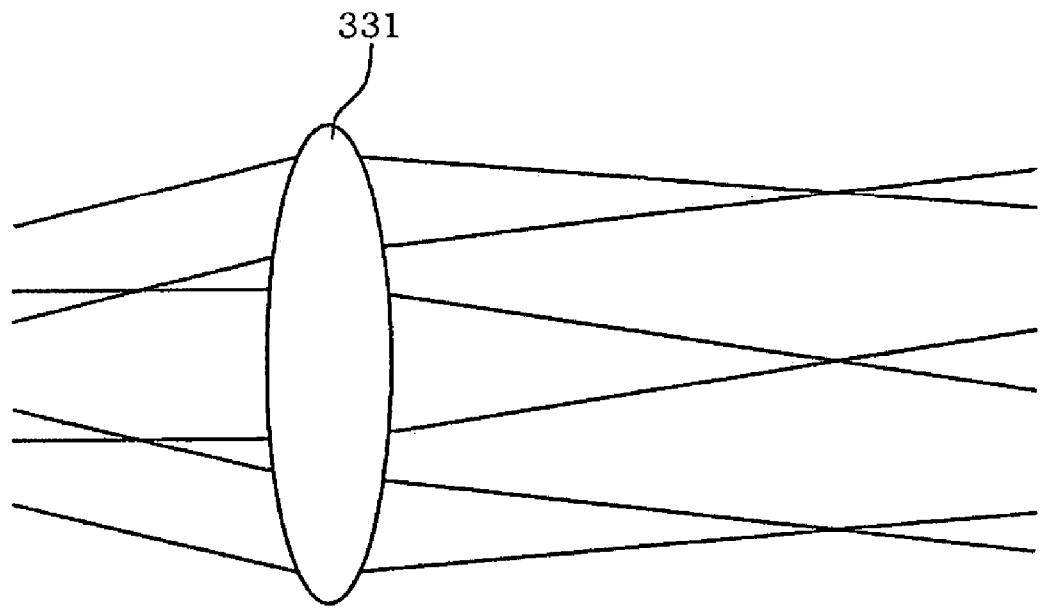

In this case, the Fourier lens 331 converges output light output from the combining system 320, as shown in FIGS. 9A and 9B. FIG. 9A is a plan view, and FIG. 9B is a side sectional view.

Referring to FIG. 9A, if three light beams, the wavelengths of which are different but the 0-order diffracted light beams of which have the same path, are incident on the Fourier lens 331, the Fourier lens 331 focuses each of the light beams.

Further, FIG. 9B shows a side sectional view for one of the three beams. After 0-order diffracted light passes through the Fourier lens 331, the 0-order diffracted light is focused on a focal point. In this case, ±1-order diffracted light is focused on a position above the focal point where the 0-order diffracted light is focused, and −1-order diffracted light is focused on a position below the focal point where the 0-order diffracted light is focused. If the filter unit 332 is located near the focal points, only diffracted light having desired orders can pass through the filter unit 332. A front view of the filter unit 332 used in this case is shown in FIG. 10. Since the distance between the 0-order diffracted light and the ±1-order diffracted light varies with the wavelength, they can be separated using the mechanical filter unit 332.

The dichroic filter 332 is well illustrated in FIGS. 10A to 10E. The dichroic filter 332 receives a plurality of diffracted light beams, which are radiated from various light sources and then diffracted by the diffractive light modulators 316a to 316c, through the Fourier lens 331. Thereafter, the dichroic filter 332 passes only some of the multi-diffracted light beams having predetermined diffraction coefficients, more particularly, the 0-, +1- and −1-order diffraction coefficients, therethrough, and then outputs the passed multi-diffracted light beams to the projection system 340, which will be described later.

Figure 10A:
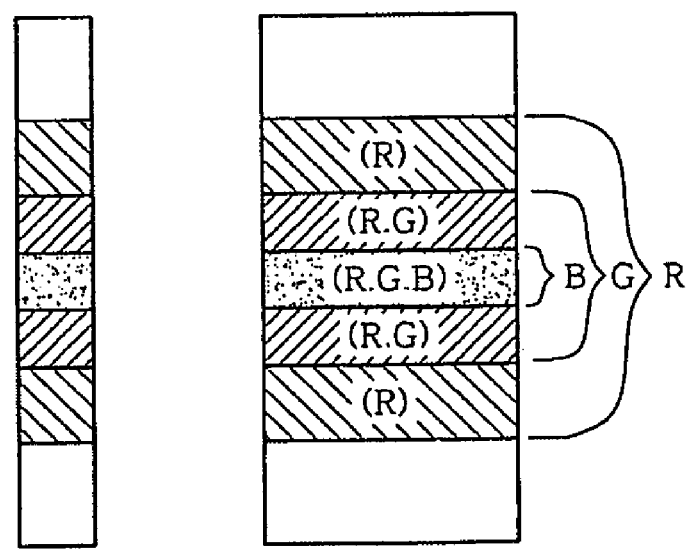
FIG. 10A is a side view and a front view showing a 0-order dichroic filter used in the present invention.

In this case, the side and front views of the dichroic filter 332 are shown in FIG. 10A, which shows a 0-order diffraction filter. In this filter, a region B is coated with a material that transmits 0-order diffracted light beams having a red, green or blue color. The portions of a region G that do not overlap the region B are coated with a material that transmits 0-order diffracted light beams having a green or red color. The portions of a region R that do not overlap the regions B and G are coated with a material that transmits only a 0-order diffracted light beam having a red color. Furthermore, the other portions are coated with a material that does not transmit light beams having a blue, green or red color.

Figure 10B:
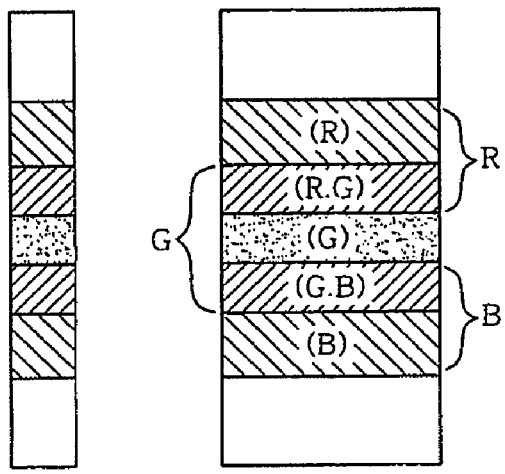
FIGS. 10B and 10C are side views and front views showing ±1-order dichroic filters used in the present invention.

A ±1-order filter is shown in FIG. 10B. The portion of a region R that does not overlap a region G is coated with a material that transmits ±1-order diffracted light beams having a red color. The portions where the regions R and G overlap each other are coated with a material that transmits ±1-order diffracted light beams having a red or green color. The portion of the region G that does not overlap the region R or the region B is coated with a material that transmits ±1-order diffracted light beams having a green color. The portion of the region G that overlaps the region B is coated with a material that transmits ±1-order diffracted light beams having a green or blue color. The portion of the region B that does not overlap the region G is coated with a material that transmits only ±1-order diffracted light beams having a blue color.

Figure 10C:
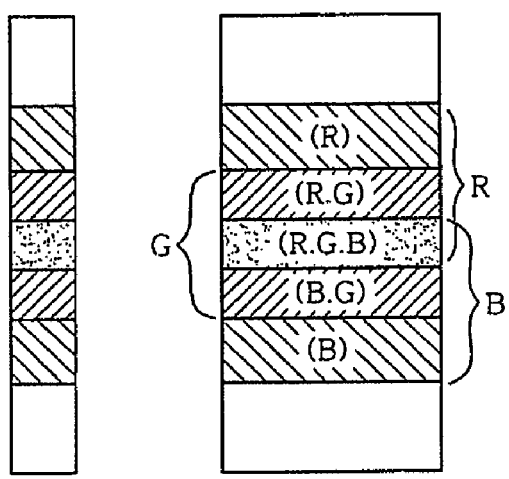

Furthermore, another ±1-order filter is shown in FIG. 10C. The portion of a region R that does not overlap a region G is coated with a material that transmits ±1-order diffracted light beams having a red color. The portions where only the regions R and G overlap each other are coated with a material that transmits ±1-order diffracted light beams having a red or green color. The portion where regions R, G and B overlap one another is coated with a material that transmits ±1-order diffracted light beams having a red, green or blue color.

The region G is composed of the portion that overlaps only the region R, and the portion that overlaps the regions R and B, and the portion that overlaps only the region B. The region B is also composed of the portion that overlaps the region G and the region R, the portion that overlaps only the region G, and the portion that transmits diffracted light beams having a blue color.

As described above, if the dichroic filter 332 is used, filtering can be performed on light beams having a plurality of wavelengths using a single filter, so that the light beams can be separated on an order basis. An interval between filters can be determined according to the following Equation 1.

$$D = \lambda/\Lambda * f(\lambda) \quad (1)$$

where D is the distance between filters, λ is the waveform of a light source, Λ is the cycle of a diffraction grating, and f(λ) is the focus distance of the Fourier lens 331 that varies depending upon the wavelength. Accordingly, in the case of the 0-order filter and the ±1-order filter, a transmission pattern and a reflection pattern are opposite to each other.

Figure 10D:
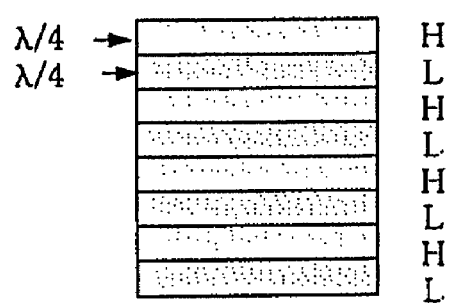
FIG. 10D is a front view showing a dichroic filter having a high transmittance characteristic used in the present invention.
Figure 10E:
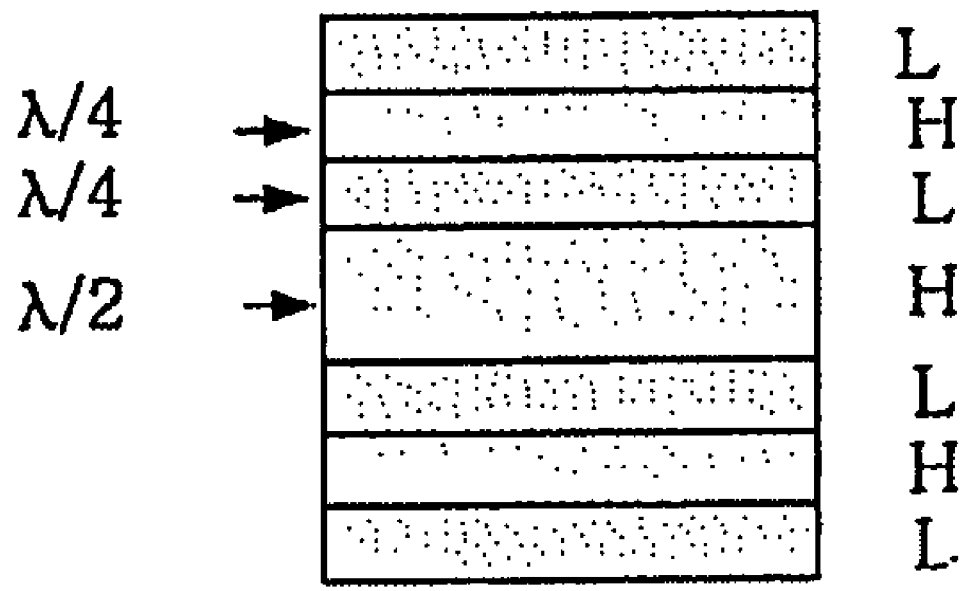
FIG. 10E is a front view showing a dichroic filter having a high transmittance characteristic used in the present invention.

Meanwhile, the dichroic filter 332 may employ a high reflectance scheme or a high transmittance scheme. For the high transmittance scheme, if two types of media having a high refractive index and a low refractive index, respectively, are alternately multi-coated so that each layer has an optical thickness of λ/4 as shown in FIG. 10D, the dichroic filter 332 can have high transmittance. For the high reflectance scheme, if two types of media having a high refractive index and a low refractive index, respectively, are alternately multi-coated so that each layer has an optical thickness of λ/4, with a medium with a high refractive index being located at the center of the dichroic filter 332 and having an optical thickness of λ/2, and with media with a low refractive index being located at both ends of the dichroic filter 332, so that layers are symmetrical to each other as shown in FIG. 10E, the dichroic filter 332 can have high transmittance. Materials used as the medium having a high refractive index include $TiO_2$, $ZnO$, $Ta_2O_5$, $SrTiO_3$, $HfO_2$, $CeO_2$ and $ZnS$. However, $ZnS$ is chiefly used, and has a refractive index in the range of about 2.3 to 2.4.

Materials used as the medium having a low refractive index include $SiO_2$, $MgF_2$, $NaF$, $LiF$, $CaF_2$, $AlF_3$ and cryolite$\{AlF_3(NaF)_3\}$. However, $MgF_2$ is chiefly used.

The projection system 340 projects incident diffracted light onto the screen 350. That is, the projection system 340 functions to focus diffracted light beams having predetermined diffraction coefficients, which are incident through the dichroic filter 332, onto the screen 350, thereby forming a spot. More particularly, the projection system 340 may be a projection lens.

If the dichroic slit according to the present invention is used, a simple optical system can be constructed and a color image can be implemented using the simple optical system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A color display device, comprising:
   an illumination lens system for converting a plurality of light beams, which are output from a plurality of light sources, into linear parallel light beams;
   a diffractive light modulation system for producing a plurality of diffracted light beams having a plurality of diffraction orders by modulating each of the plurality of parallel light beams that are almost perpendicularly incident from the illumination lens system;
   a combining system for focusing the plurality of diffracted light beams having the plurality of diffraction orders, which are incident from the diffractive light modulation system;
   a Fourier filter system for selecting diffracted light beams having desired diffraction orders from among the plurality of diffracted light beams focused by the combining system, using a dichroic filter; and
   a projection system for focusing the diffracted light beams, which are selected by the Fourier filter system, on an object, and allowing the focused diffracted light beams to scan the object.

2. The color display device as set forth in claim 1, wherein the diffractive light modulation system comprises:
   a plurality of diffractive light modulators for producing the plurality of diffracted light beams having the plurality of diffraction orders by modulating each of the plurality of parallel light beams incident from the illumination lens system; and
   first reflection mirrors for reflecting the light beams incident from the illumination lens system such that the light beams are almost perpendicularly incident on the diffractive light modulators.

3. The color display device as set forth in claim 1, wherein the combining system comprises:
   a plurality of prisms for transmitting or reflecting the diffracted light beams having the plurality of diffraction orders; and
   a plurality of second reflection mirrors for causing the diffracted light beams, which are output from the diffractive light modulation system, to be incident on the prism so that the plurality of diffracted light beams output from the plurality of prisms is converged.

4. The color display device as set forth in claim 1, wherein the combining system comprises:
   a beam splitter for transmitting or reflecting the plurality of diffracted light beams having the plurality of diffraction orders; and
   a plurality of second reflection mirrors for causing the diffracted light beams, which are output from the diffractive light modulation system, to be incident on the prisms so that the plurality of diffracted light beams output from the beam splitter is converged.

5. The color display device as set forth in claim 1, wherein the Fourier filter system comprises:
   a Fourier lens for separating the plurality of diffracted light beams converted by the combining system on an order basis; and a dichroic filter for obtaining diffracted light beams having desired orders from each of the plurality of diffracted light beams separated by the Fourier lens.

6. The color display device as set forth in claim 5, wherein the dichroic filter has portions corresponding to the diffracted light beams having the desired orders, the portions being coated with corresponding transmissive materials.

7. The color display device as set forth in claim 5, wherein the dichroic filter has portions other than portions corresponding to the diffracted light beams having the desired orders, the other portions being coated with a reflective material.

* * * * *